(12) United States Patent
Zhang et al.

(10) Patent No.: US 7,212,666 B2
(45) Date of Patent: May 1, 2007

(54) GENERATING VISUALLY REPRESENTATIVE VIDEO THUMBNAILS

(75) Inventors: Dong Zhang, Beijing (CN); Yijin Wang, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 10/405,971

(22) Filed: Apr. 1, 2003

(65) Prior Publication Data

US 2004/0197071 A1 Oct. 7, 2004

(51) Int. Cl.
*G06K 9/00* (2006.01)

(52) U.S. Cl. ..................................... 382/162

(58) Field of Classification Search ............... 382/232, 382/239, 240, 244, 248; 348/699–701; 715/500.1, 715/723, 767, 854
See application file for complete search history.

(56) References Cited

U.S. PATENT DOCUMENTS

| 5,835,163 | A | * | 11/1998 | Liou et al. | 348/700 |
| 5,881,176 | A | * | 3/1999 | Keith et al. | 382/248 |
| 5,892,847 | A | * | 4/1999 | Johnson | 382/232 |
| 5,956,026 | A | * | 9/1999 | Ratakonda | 715/723 |
| 5,995,095 | A | * | 11/1999 | Ratakonda | 715/500.1 |
| 6,453,073 | B2 | * | 9/2002 | Johnson | 382/239 |
| 6,970,602 | B1 | * | 11/2005 | Smith et al. | 382/232 |

2002/0133486 A1  9/2002  Yanagihara et al.

FOREIGN PATENT DOCUMENTS

EP  0 690 413  1/1996

OTHER PUBLICATIONS

"Image Analysis", Stahlberg et al., Digital Image Processing in Natural Sciences and Medicine, Chapter 3.4, Sep. 7, 2002, pp. 97-130.
"Comparison and Improvement of Color-based Image Retrieval Techniques", Zhang et al., SPIE, vol. 3312, Dec. 1997, pp. 371-382.
"Adaptive Key Frame Extraction Using Unsupervised Clustering", Zhuang et al., Department of Computer Science, Zhejiang University, 5 pages.
"A Study on Video Browsing Strategies", Ding et al., Digital Library Research Group, College of Library and Information Services, Human-Computer Interaction Laboratory, University of Maryland, 18 pages.
"Video Summarization by Curve Simplification", DeMenthon et al., Language and Media Processing, University of Maryland, ACM Multimedia 1998, Bristol, UK, pp. 211-218.

(Continued)

*Primary Examiner*—Jose L. Couso
(74) *Attorney, Agent, or Firm*—Lee & Hayes, PLLC

(57) ABSTRACT

An algorithm identifies a salient video frame from a video sequence for use as a video thumbnail. The identification of a video thumbnail is based on a frame goodness measure. The algorithm calculates a color histogram of a frame, and then calculates the entropy and standard deviation of the color histogram. The frame goodness measure is a weighted combination of the entropy and the standard deviation. A video frame having the highest value of frame goodness measure for a video sequence is determined as the video thumbnail for a video sequence.

39 Claims, 10 Drawing Sheets

OTHER PUBLICATIONS

"Automatic Partitioning of Full-Motion Video", Zhang et al., Institute of Systems Science, National University of Singapore, Multimedia Systems, Springer-Verlag 1993, 19 pages.

"An Integrated System for Content-Based Video Retrieval and Browsing", Zhang et al., Institute of Systems Science, National University of Singapore, pp. 1-42.

"Gisting of Video Documents: A Key Frames Selection Algorithm Using Relative Activity Measure", Gresle et al., Beckman Institute, University of Illinois, pp. 279-286.

* cited by examiner

GENERATING VISUALLY REPRESENTATIVE VIDEO THUMBNAILS

TECHNICAL FIELD

The present disclosure generally relates to video presentation technology, and more particularly, to generating a video thumbnail that represents the salient content of a video sequence.

BACKGROUND

The rapid advancement of multimedia computing technologies and networked communications has dramatically increased the amount of digital multimedia (e.g., video, audio, still images) stored in digital libraries. However, methods for accessing such multimedia data, video in particular, have not kept pace with the increase in amounts of such multimedia. Traditional retrieval systems for text-based documents permit browsing of document surrogates (e.g., keywords, abstracts) for a rapid overview of document information that assists in filtering out irrelevant documents and further examining documents of interest.

Due to the unique characteristics of video, however, traditional surrogates and text-oriented browsing mechanisms are less useful for accessing video data. Video data conveys video and audio information whose spatial and temporal expression and sheer volume make it beyond adequate description using mere words. Thus, the use of a video "abstracts" (i.e., representative still pictures extracted from video sequences) is of significant interest as a way to facilitate content-based browsing and access to video data.

Current methods for browsing/accessing video content involve detecting shot boundaries and extracting key frames from video sequences for use as video abstracts or summaries. A video shot is a contiguous sequence of video frames recorded from a single camera. Video shots form the building blocks of a video sequence. The purpose of shot boundary detection is to segment a video sequence into multiple video shots from which key frames can be extracted. A key frame is a video frame that provides a thumbnail representation of the salient content of a shot. The use of key frames reduces the amount of data required in video indexing and provides a way to organize and browse video content.

Key frame extraction continues to be an important topic to which significant effort is devoted. One easy technique often used for key frame extraction is to select the first frame of each video shot as the shot's key frame. This technique is computationally inexpensive, but typically fails to effectively capture salient visual content for a video shot. Other techniques for key frame extraction include the use and analysis of various visual criteria such as color features and motion between video frames. Such techniques may improve the capturing of salient visual content, but they tend to be computationally expensive. Thus, although key frame extraction techniques have improved, they continue to suffer disadvantages including their significant computational expense and their inability to effectively capture salient visual content from video data.

In addition, such prior techniques for key frame extraction do not determine key frames intended to represent an entire video sequence. Rather, such techniques determine key frames intended to represent particular video shots within a video sequence.

Accordingly, a need exists for a way to represent a whole video sequence that accurately portrays the salient content of the video sequence in a manner that facilitates content-based browsing of various video data.

SUMMARY

A system and methods are disclosed for generating a video thumbnail for a video sequence by identifying a video frame that visually represents the salient content of the video sequence. A video thumbnail algorithm calculates a frame goodness measure as a function of the weighted combination of a histogram entropy and a histogram standard deviation for a video frame. A particular frame is selected as a video thumbnail based on a comparison of frame goodness measures for various frames within a video sequence.

In one embodiment, a frame goodness measure is calculated for each video frame in a video sequence. Calculating a frame goodness measure includes calculating a histogram for a frame. An entropy and a standard deviation are then calculated for the histogram. The frame goodness measure is then calculated as a weighted combination of the entropy and the standard deviation. Frame goodness measures for each video frame are compared to one another to determine which video frame is most salient. The frame having the highest value of frame goodness measure is chosen as a video thumbnail.

In another embodiment, a video sequence is temporally segmented and frame goodness measures are calculated for frames within a particular segment of the video sequence (e.g., the beginning, middle, or end of the video sequence). A local maximum frame goodness measure is determined for the particular video segment. Then, the video frame associated with the local maximum frame goodness measure is selected as a video thumbnail for the video sequence.

In another embodiment, a video sequence is segmented into video shots, and frame goodness measures are calculated for frames within each shot. Local maximum frame goodness measures are determined for each video shot. A video thumbnail for the video sequence is selected as the video frame associated with the highest valued local maximum frame goodness measure.

BRIEF DESCRIPTION OF THE DRAWINGS

The same reference numerals are used throughout the drawings to reference like components and features.

DETAILED DESCRIPTION

Overview

The following discussion is directed to systems and methods for identifying salient, content-rich video thumbnails from video frames within video files or sequences. The subject matter is described with specificity to meet statutory requirements. However, the description itself is not intended to limit the scope of the disclosed subject matter. Rather, the description is written in contemplation that the claimed subject matter might also be embodied in other ways, to include different elements or combinations of elements similar to the ones described in this document, in conjunction with other present or future technologies.

The systems and methods described herein implement a thumbnail identification algorithm to identify a salient video frame from a video sequence for use as a video thumbnail. The identification of a video thumbnail is based on a frame goodness measure. The algorithm calculates a color histogram of a frame, and then calculates the entropy and standard deviation of the color histogram. The frame goodness measure is a weighted combination of the entropy and the standard deviation. A video frame having the highest value of goodness measure for a video sequence is determined as the video thumbnail for a video sequence. Benefits of the disclosed systems and methods include the generation of video thumbnails that accurately represent the content of video files.

Exemplary Environment

Figure 1:
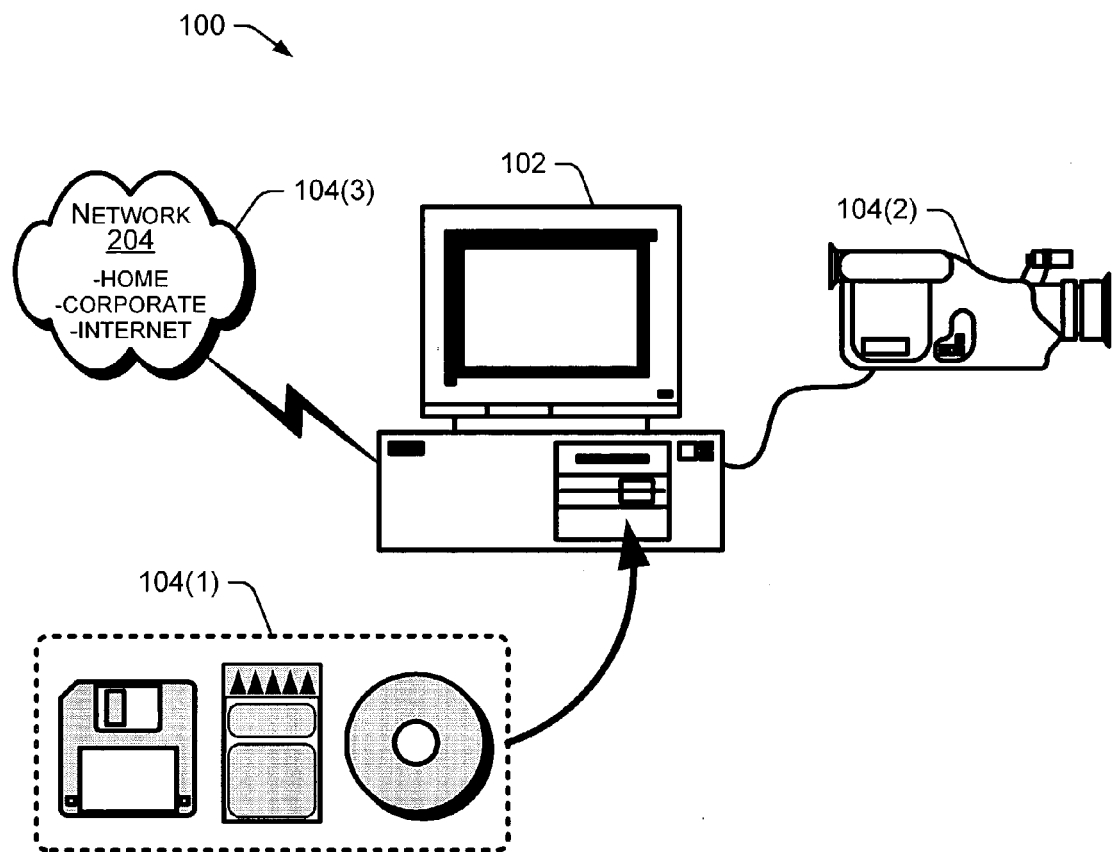
FIGS. 1 and 2 illustrate exemplary environments that are suitable for identifying video thumbnails for video files.
Figure 2:
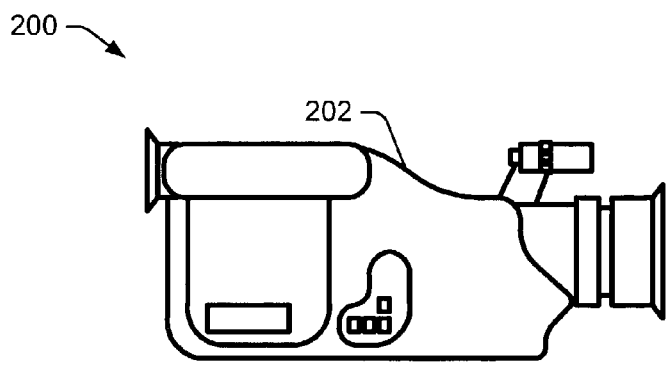

FIGS. 1 and 2 illustrate exemplary environments that are suitable for identifying video thumbnails for video files. The exemplary environment 100 of FIG. 1 includes a computer 102 and one or more video input sources 104.

Video input sources 104 can be any type of device or communication network capable of transferring video content to computer 102, including for example, portable storage media 104(1) (e.g., magnetic discs, media cards, optical discs), a video recording device 104(2), or a network 104(3) such as the Internet, a corporate network, or a home network.

Video recording device 104(2) can be any of various digital recording devices capable of recording live-motion video and audio for later replay through, for example, VCRs, TVs, and personal computers such as computer 102. A video recording device 104(2) is typically capable of being connected directly to computer 102 using an i.LINK (IEEE 1394) or FireWire digital interface, so that video content can be edited directly on the computer 102.

Computer 102 may be implemented as various computing devices generally capable of receiving video content from various sources 104 and manipulating the video content for playback through, for example, a media player. Computer 102 is otherwise typically capable of performing common computing functions, such as email, calendaring, task organization, word processing, Web browsing, and so on. In this embodiment, computer 102 runs an open platform operating system, such as the Windows® brand operating systems from Microsoft®. Computer 102 may be implemented, for example, as a desktop computer, a server computer, a laptop computer, or other form of personal computer (PC). One exemplary implementation of computer 102 is described in more detail below with reference to FIG. 13.

As discussed in greater detail below with reference to the embodiments of FIG. 3, computer 102 is generally configured to receive a video sequence or file (i.e., video content) from a video content source 104, and to identify a video frame within the video sequence that is suitable for use as a video thumbnail whose visual content substantially represents the whole video sequence.

The exemplary environment 200 of FIG. 2 includes a stand alone video recording device 202. The video recording device 202 may be configured in substantially the same manner as the video recording device 104(2) of FIG. 1. Thus, video recording device 202 is typically capable of being connected directly to a computer using an i.LINK (IEEE 1394) or FireWire digital interface. However, the stand alone video recording device 202 of FIG. 2 is intended to illustrate that such a device may be generally configured (like computer 102) to identify a video frame from a captured video sequence that is suitable for use as a video thumbnail whose visual content substantially represents the whole video sequence.

Exemplary Embodiments

Figure 3:
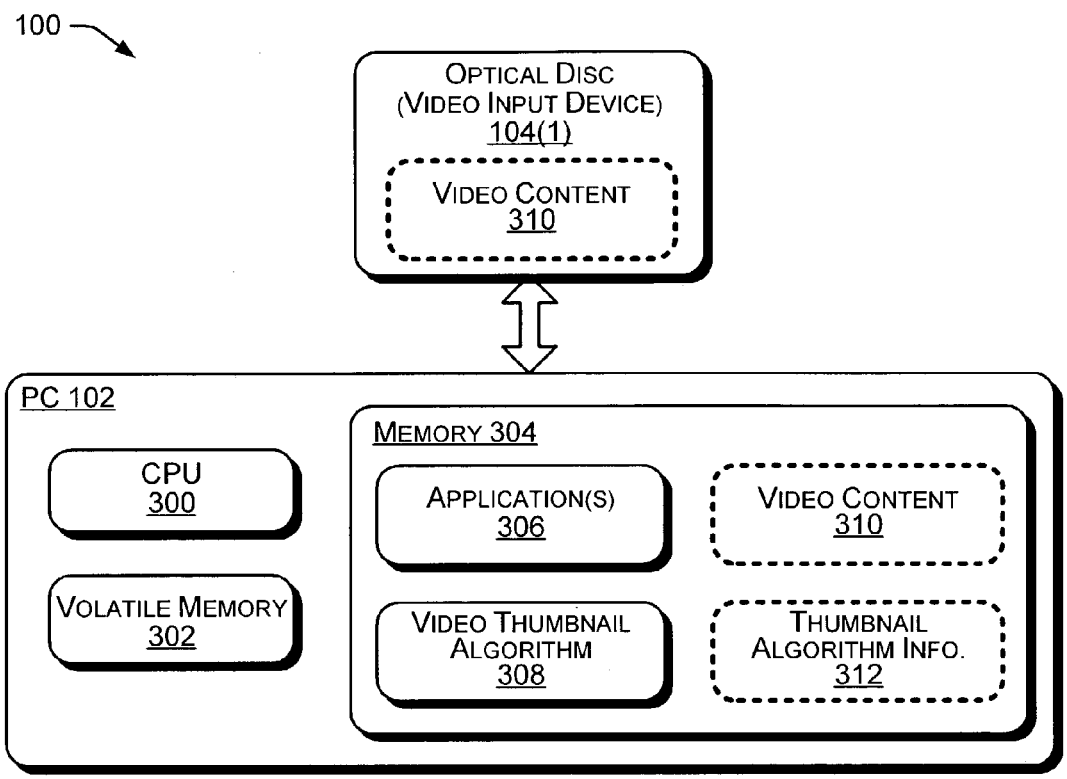
FIG. 3 is a block diagram representation of a computer and video input source as might be implemented in the environment of FIG. 1.

FIG. 3 is a block diagram representation of a computer 102 and video input source 104 as might be implemented in the environment 100 of FIG. 1. Computer 102 is implemented as a PC (personal computer), such as a desktop or laptop PC. Video input source 104 is implemented as an optical disc 104(1).

PC 102 includes a processor 300, a volatile memory 302 (i.e., RAM), and a nonvolatile memory 304 (e.g., ROM, hard disk, floppy disk, CD-ROM, etc.). Nonvolatile memory 304 generally provides storage of computer/processor-readable instructions, data structures, program modules and other data for PC 102. PC 102 typically implements various application programs 306 stored in memory 304 and executed on processor 300. Such applications 306 may include software programs implementing, for example, word processors, spread sheets, browsers, multimedia players, illustrators, computer-aided design tools and the like. One exemplary implementation of a PC 102 is described in more detail below with reference to FIG. 13.

In addition to applications 306, PC 102 implements a video thumbnail algorithm 308. Although depicted in FIG. 3 as a separate, stand alone software application executable on processor 300, video thumbnail algorithm 308 may well be implemented as a function of a higher level application 306. Such applications 306 might typically include, but are not limited to, browsers, video software editing products, VCR control systems, MPEG ripper applications, and so forth.

Figure 4:
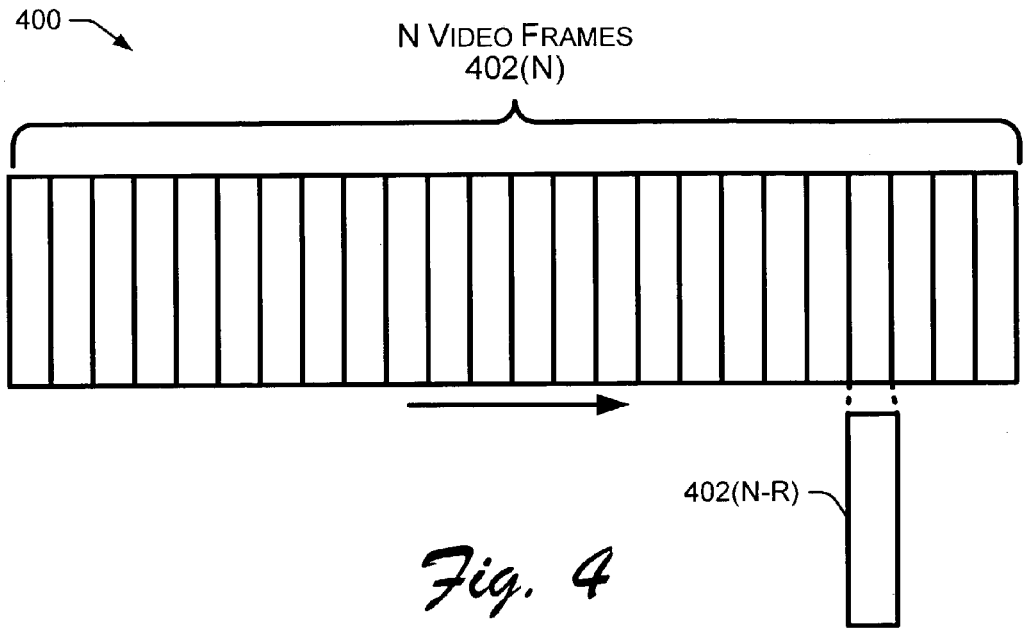
FIG. 4 is a high-level representation of a video sequence.

In one embodiment, video thumbnail algorithm 308 is configured to analyze video content 310 received from a video input device 104 (e.g., optical disc 104(1)), such as the video sequence 400 shown in FIG. 4, and to identify (i.e., extract) a video frame 402 from the video sequence 400 as a salient video thumbnail that substantially represents the content of the whole video sequence 400. In the process of performing calculations to identify a video thumbnail, video thumbnail algorithm 308 generates and uses thumbnail algorithm information 312. It is noted that although video content 310 and thumbnail algorithm information 312 are illustrated as residing in nonvolatile memory 304, they may additionally reside in whole or in part in volatile memory 302.

FIG. 4 is a high-level representation showing a video sequence 400. The video sequence 400 represents any number of frames 402(N) (one through N), that represent the entire length of a video content 310. Shown below the video frame sequence 400 is a particular video frame 402(N–R) that represents a video frame that has been selected by video thumbnail algorithm 308 (FIG. 3) as a video thumbnail to represent the salient content of the whole video sequence 400.

Referring again to the embodiment of FIG. 3, the video thumbnail algorithm 308 determines a video thumbnail by calculating a frame goodness measure for a each frame in the video sequence 400. The frame goodness measure represents a measure of the extent to which a given video frame visually represents the salient content of the whole video sequence 400. Thus, the frame goodness measure represents a way to extract the most representative and visually satisfactory frame 402 as a video thumbnail to represent the whole video sequence 400.

To calculate a frame goodness measure for a video frame 402, video thumbnail algorithm 308 first makes two calculations (i.e., entropy and standard deviation) on a video frame's color histogram. A color histogram is an important and well-known image analysis tool that provides a statistical representation of the pixels of an image. The statistical representation shows what color pixels are present in an image and how many pixels of each color are present in the image. A color histogram can be represented as a bar graph where each entry on the horizontal axis is one of the possible colors that pixel could have.

In no required order, the first calculation that the video thumbnail algorithm 308 performs on a video frame's color histogram is an entropy calculation. Entropy is the measure of uncertainty of a random variable. Let X be a discrete random variable, and x be the set of possible outcomes of X. The probability mass function of the random variable X is p(x). The entropy of X is thus defined by the following expressions:

$$p(x_j) = \frac{h(x_j)}{\sum_i (x_i)} \quad (1)$$

$$\text{Entropy} = -\sum_i h(x_j) \log \frac{h(x_j)}{\sum_i x_i} \quad (2)$$

When the probability of color data points (pixels) is uniformly distributed, the outcome is uncertain and the entropy is at a maximum. More specifically, if there is a maximum number of color values in a color image (i.e., a color video frame 402) and those colors are uniformly distributed, then the entropy of the image is maximized. Such an image is deemed to be the most colorful image. In addition, such an image usually contains better visual effects than other images with less colors.

However, when color data points (pixels) in an image have a highly skewed probability mass function, the outcome is likely to fall within a small set of outcomes, so the outcome is more certain (i.e., the uncertainty is low) and the entropy is low. Thus, if there is a minimum number of color values (for example only one color) in the image (i.e., video frame 402), the entropy of the image is minimized. For a color image that has only one color value, the entropy of the image histogram is zero. Such an image usually contains worse visual effects than other images with more colors. Thus, the entropy of the color histogram of a video frame 402 is useful as a first part of the measure of frame goodness.

Again, in no required order, the second calculation that the video thumbnail algorithm 308 performs on a video frame's color histogram is a standard deviation calculation. The standard deviation of the color histogram is a measure of the spread of color in the image histogram, which is defined as follows:

$$SD = \sqrt{\frac{\sum_{i=1}^{N}(h(x_i) - M)^2}{N}} \quad (3)$$

$$M = \frac{\sum_{i=1}^{N} h(x_i)}{N} \quad (4)$$

The standard deviation of an image histogram indicates the color range of is the image. The larger range of color values in a image, the larger the contrast of the image. Images having larger contrast tend to be visually more interesting to the human visual system than those with lesser contrast. Thus, the standard deviation of the color histogram of a video frame 402 is useful as a second part of the measure of frame goodness.

In general, the more colorful video frames (i.e., higher entropy of the color histogram) and higher contrast video frames (i.e., higher standard deviation of the color histogram) are frames that are visually preferred. Thus, a frame goodness measure can be defined as a combination of the entropy and the standard deviation of the color histogram of a video frame, as follows:

$$G = \acute{\omega}_1 \text{Entropy} + \acute{\omega}_2 SD \quad (5)$$

$$\acute{\omega}_1 + \acute{\omega}_2 = 1 \quad (6)$$

In addition, it is noted that both 'Entropy' and 'SD' are normalized to the range of [0,1] using formula (6) before using formula (5) to calculate the frame goodness. Thus, the frame goodness measure is a weighted combination of the entropy and standard deviation of the color histogram so that either can be emphasized if desired.

The larger the value of G, the better the visual quality of the video frame.

Therefore, referring again to FIG. 4, in addition to calculating a frame goodness measure for each frame in the video sequence 400, the video thumbnail algorithm 308 also compares the frame goodness measures to one another and determines which is the greatest in value. The video thumbnail algorithm 308 then selects the video frame (e.g., 402 (N–R)) with the largest calculated frame goodness measure as a video thumbnail that significantly visually represents the content of video sequence 400.

The frame goodness measure described above can be used in various ways to determine a video frame as a representative video thumbnail for a video sequence. As mentioned above with respect to FIG. 4, for example, one embodiment of the video thumbnail algorithm 308 determines a video thumbnail by calculating a frame goodness measure for each frame in the video sequence 400, and then comparing all of the frame goodness measures to locate the frame having the highest calculated value of frame goodness. Additional examples for applying the frame goodness measure to a video sequence are discussed below with respect to FIGS. 5–7.

Figure 5:
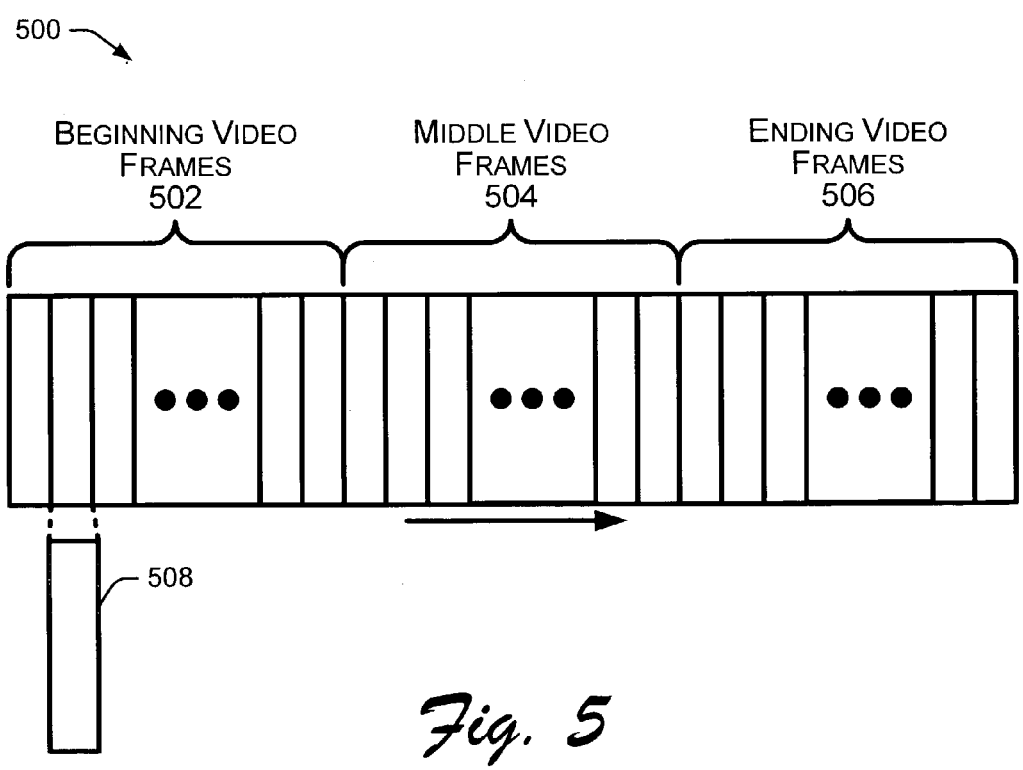
FIG. 5 illustrates an embodiment of a video thumbnail algorithm that segments a video sequence temporally before applying a frame goodness measure.

In another embodiment, the video thumbnail algorithm 308 segments a video sequence 500 (FIG. 5) prior to applying the frame goodness measure to individual video frames. FIG. 5 illustrates an embodiment of a video thumbnail algorithm 308 that segments a video sequence temporally before applying the frame goodness measure to video frames within a particular segment of the video sequence 500. The video sequence 500 has been temporally segmented into a beginning segment of video frames 502, a middle segment of video frames 504, and an ending segment of video frames 506. Each segment typically has a number of frames that corresponds to the length in time of the segment. For example, a 10 second segment of a video sequence that has 30 frames per second would have 300 frames in the segment. It is noted that the temporal segmentation shown in FIG. 5 is shown by way of example, and not by way of limitation. Thus, any manner of segmentation of a video sequence is possible and may be useful to facilitate the application of frame goodness measures to individual video frames within a segment.

Although the frame goodness measure may be applied to video frames in any temporal segment (e.g., the beginning segment 502, the middle segment 504, the ending segment 506), FIG. 5 illustrates the case where the video thumbnail algorithm 308 applies the frame goodness measure to video frames from a beginning set of video frames 502. The video thumbnail algorithm 308 then compares the frame goodness measures from the beginning video frames 502 to one another and determines a local maximum frame goodness measure associated with the beginning segment 502. Video frame 508 is illustrated as having the highest frame goodness measure (i.e., the local maximum) within the beginning frame segment 502. Therefore, video frame 508 is selected (i.e., extracted) as the video thumbnail that best represents the video sequence 500. In most instances, limiting the search for a video thumbnail to a particular temporal segment (e.g., 502, 504, 506) by calculating and comparing frame goodness measures for video frames within that temporal segment does not reduce the visual quality of the resulting video thumbnail 508 to a significant degree from the quality of a video thumbnail that would otherwise result from calculating and comparing frame goodness measures for all the frames over the entire video sequence 500.

Figure 6:
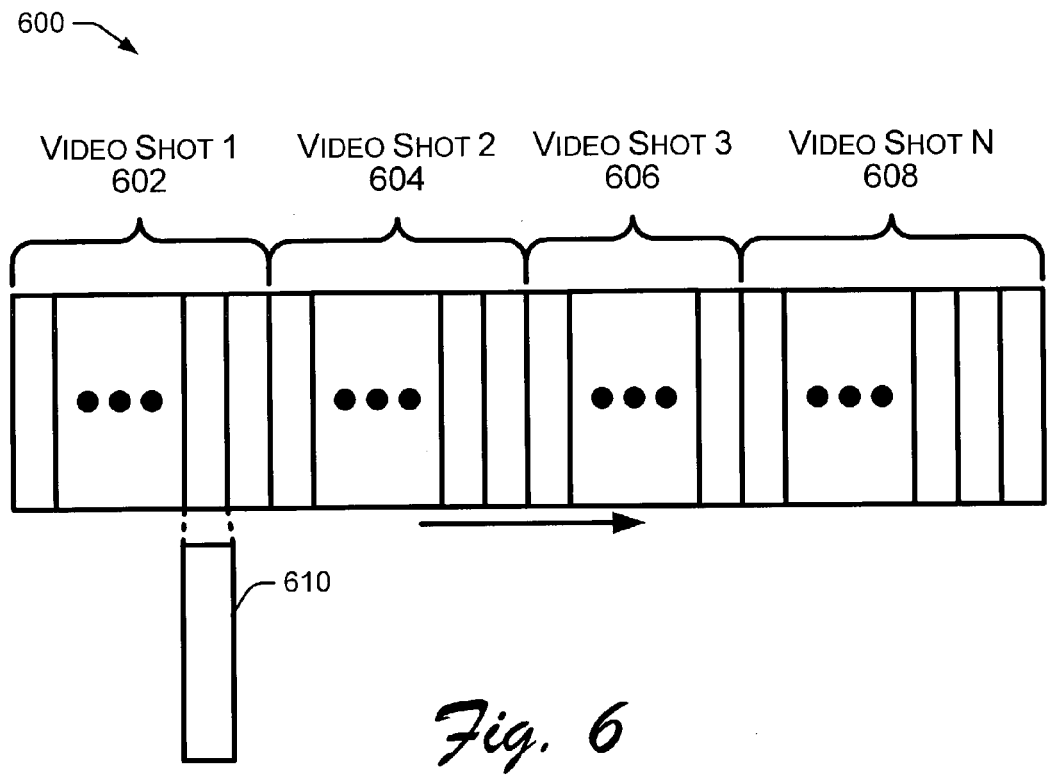
FIG. 6 illustrates representative video shots that each contain a number of video frames from a video sequence.

In yet another embodiment, the video thumbnail algorithm 308 segments a video sequence 600 (FIG. 6) into video shots prior to applying the frame goodness measure to individual video frames. A video shot is an unbroken sequence or segment of frames in a video sequence, and it often defines building blocks of a video. For example, FIG. 6 illustrates representative video shots 602, 604, 606, and 608, each containing a number of video frames from the video sequence 600. The video shots 602, 604, 606, and 608 make up the video sequence 600. A video shot can represent any particular video content. Most video shots have defined boundaries that can be distinguished by threshold deviations in the video content. Various effective shot boundary detection techniques currently exist that may be implemented by video thumbnail algorithm 308. Such detection techniques are generally well-known to those skilled in the art, however, and will therefore not be discussed in further detail.

In the FIG. 6 embodiment, video thumbnail algorithm 308 generally determines a local maximum frame goodness measure for each video shot (e.g., 602, 604, 606, 608) and then compares the local maximum goodness measures from the various video shots to determine a global maximum goodness measure for the entire video sequence 600. The global maximum goodness measure indicates which video frame from the video sequence 600 is most visually representative of the whole video sequence 600, and thus, which video frame is selected (i.e., extracted) by the video thumbnail algorithm 308 as the video thumbnail for the entire sequence 600.

Figure 7:
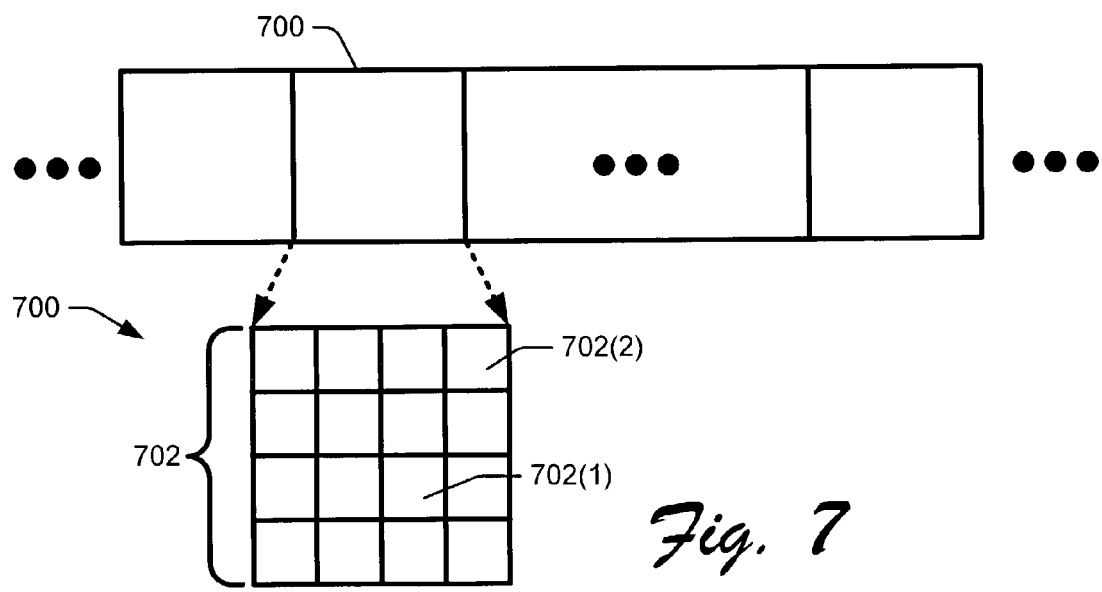
FIG. 7 illustrates a video frame broken into blocks.

FIG. 7 illustrates yet another embodiment in which video thumbnail algorithm 308 breaks a video frame 700 into blocks 702 and calculates a goodness measure for each block 702 within the video frame 700. The overall goodness measure for the video frame 700 is determined to be the minimum valued block goodness measure. Thus, if block 702(1) has the highest block goodness measure in the frame 700 and block 702(2) has the lowest block goodness measure, then the goodness measure for the frame 700 is determined to be the goodness measure calculated for the lowest valued block 702(2). This technique ensures that the goodness measure for an individual video frame 700 will always be at least as good as the minimum goodness measure for any block 702 within the video frame 700. This technique is applicable to each of the embodiments described above. That is, each time a frame goodness measure is determined in the embodiments described above, it can be determined based on a selection of a minimum block goodness measure from a plurality of blocks in the video frame.

The calculation of a block goodness measure is generally the same as the calculation of a frame goodness measure as described above. As described previously, a frame goodness measure is calculated for a given frame by first calculating an entropy of the frame's color histogram and a standard deviation of the frame's color histogram, and then combining the entropy and standard deviation. FIG. 7 illustrates how the video thumbnail algorithm 308 breaks up a given frame 700 into a plurality of blocks 702 and then performs the entropy, standard deviation, and goodness measure calculations on each block 702 of the frame. The video thumbnail algorithm 308 then selects the block goodness measure that has the minimum value to be the overall frame goodness measure for the frame 700.

Figure 8:
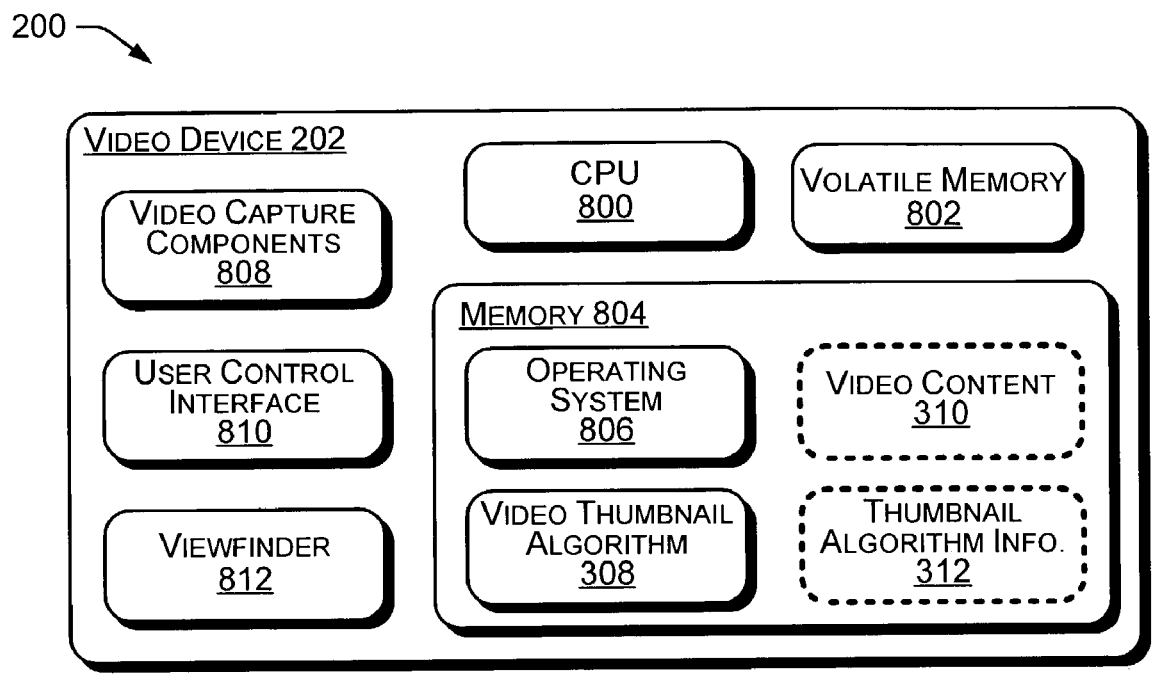
FIG. 8 is a block diagram representation of a stand alone video recording device as might be implemented in the environment of FIG. 2.

FIG. 8 is a block diagram representation of a stand alone video recording 11 device 202 as might be implemented in the environment 200 of FIG. 2. Video device 202 may be configured in substantially the same manner as the video recording device 104(2) of FIG. 1. The block diagram representation of FIG. 8 is intended to illustrate that video recording device 202 of FIG. 2 may be generally configured (like computer 102) to identify a video thumbnail from a video sequence such that the visual content of the video thumbnail substantially represents the whole video sequence in a manner similar to that described herein above with respect to computer 102. Thus, video device 202 is yet another exemplary environment in which the systems and methods of the present disclosure may be implemented.

Referring to FIG. 8, video device 202 generally includes a processor 800, a volatile memory 802 (i.e., RAM), and a nonvolatile memory 804 (e.g., ROM). Video device 202 also generally includes a portable storage media capability (not shown) and/or a digital interface such as i.LINK (IEEE 1394) or FireWire digital interface (not shown) to enable the transfer of recorded video content. Operating system software 806 is stored in memory 804 and executable on processor 800 to control various functions and video components such as video capture components 808. Video capture components 808 include typical video components such as focusing lenses, charge-coupled devices (CCDs), and an analog to digital converter. The operating software 806 generally responds to user input entered via a user control interface 810 to perform functions such as receiving visual information, converting the information to an electronic signal, and storing it as video content 310. Viewfinder 812 generally permits a user to view video content 310 and other information as controlled through interface 810. The general operation and functionality of a video recording device 202 is well-known.

The video thumbnail algorithm 308 on video device 202 is configured to function in a manner similar to that discussed above with respect to computer 102. Thus, the descriptions above regarding FIGS. 4–7 are equally applicable to video device 202. Accordingly, when video content 310 is recorded via the typical operation of video device 202, video thumbnail algorithm 308 operates to determine video thumbnails that visually represent recorded video sequences (i.e., video files). Calculations and other algorithm information are temporarily stored as thumbnail algorithm information 312. The video thumbnails generated by video thumbnail algorithm 308 can be viewed/browsed through viewfinder 812 and manipulated via user control interface 810.

Exemplary Methods

Exemplary methods for identifying salient, content-rich video thumbnails that represent video sequences will now be described with primary reference to the flow diagrams of FIGS. 9, 10, 11 and 12. The methods apply generally to the exemplary embodiments discussed above with respect to FIGS. 3–8. The elements of the described methods may be performed by any appropriate means including, for example, by the execution of processor-readable instructions defined on a processor-readable medium.

A "processor-readable medium" as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection having one or more wires, a portable computer diskette, a random access memory (RAM), a read-only memory (ROM), an erasable programmable-read-only memory (EPROM or Flash memory), an optical fiber, and a portable compact disc read-only memory (CDROM).

Figure 9:
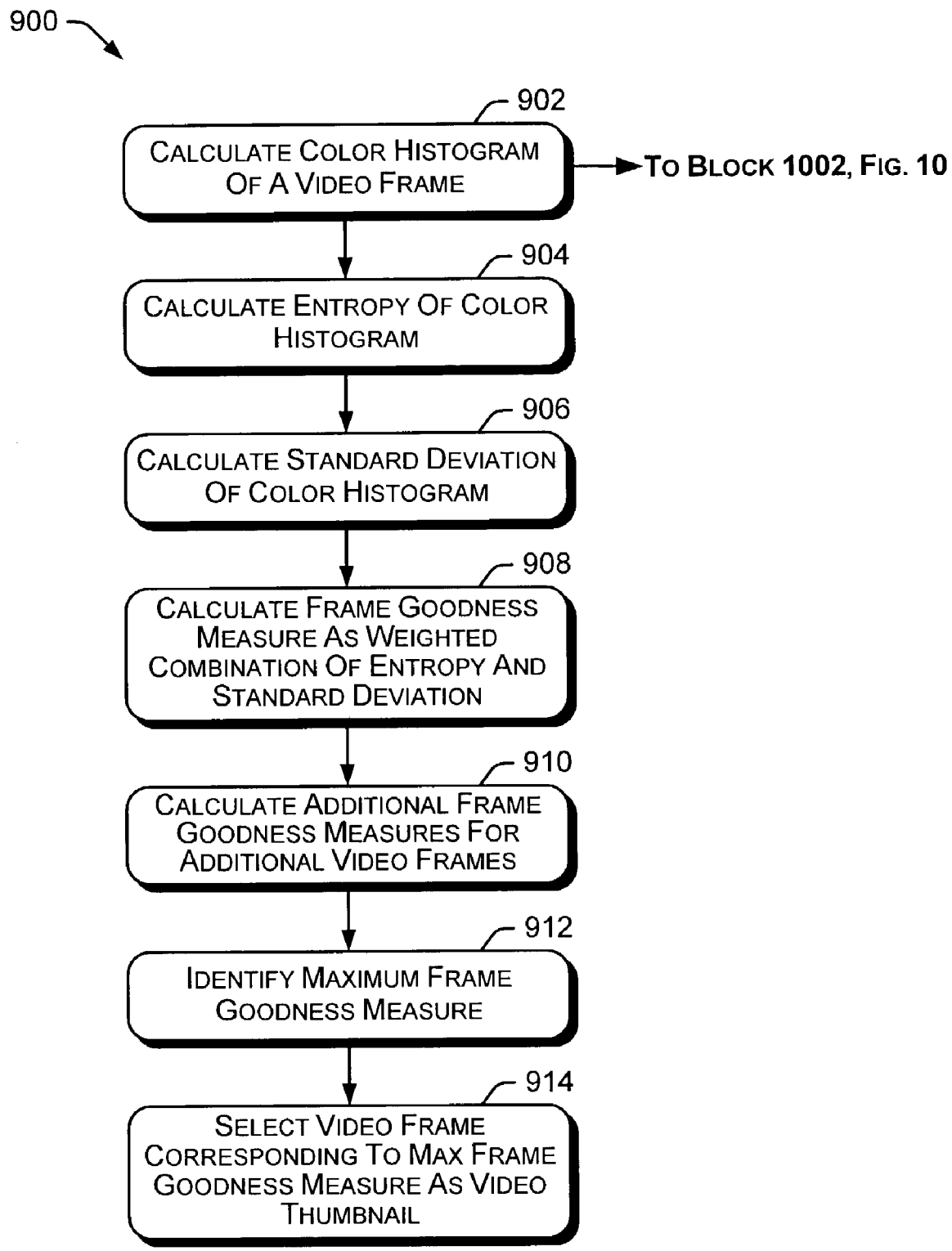
FIGS. 9, 10, 11 and 12 are flow diagrams illustrating exemplary methods for identifying salient, content-rich video thumbnails that represent video sequences.

FIG. 9 shows an exemplary method 900 for identifying a video thumbnail that visually represents the salient content of an entire video sequence. At block 902, a color histogram is calculated on a video frame from a video sequence. The video sequence may be video content received by a computer from various video sources (e.g., portable storage media, a network connection, a video camera) or it may be video content recorded by a video recording device. Thus, the calculations discussed in method 900 may be performed on a computer, a video recording device, or any similar device. At block 904, the entropy of the color histogram is calculated according to equations (1) and (2) as discussed above. At block 906, the standard deviation of the color histogram is calculated according to equations (3) and (4) as discussed above. At block 908, a frame goodness measure is calculated. The frame goodness measure for the frame is calculated as a weighted combination of the entropy and standard deviation according to equations (5) and (6) as discussed above.

At block 910, additional frame goodness measures are calculated in a like manner for additional video frames in the video sequence. At block 912, a maximum frame goodness measure is identified from all of the calculated frame goodness measures. At block 914, a video frame that corresponds with the maximum valued frame goodness measure is selected as a video thumbnail that visually represents the salient content of the whole video sequence.

Figure 10:
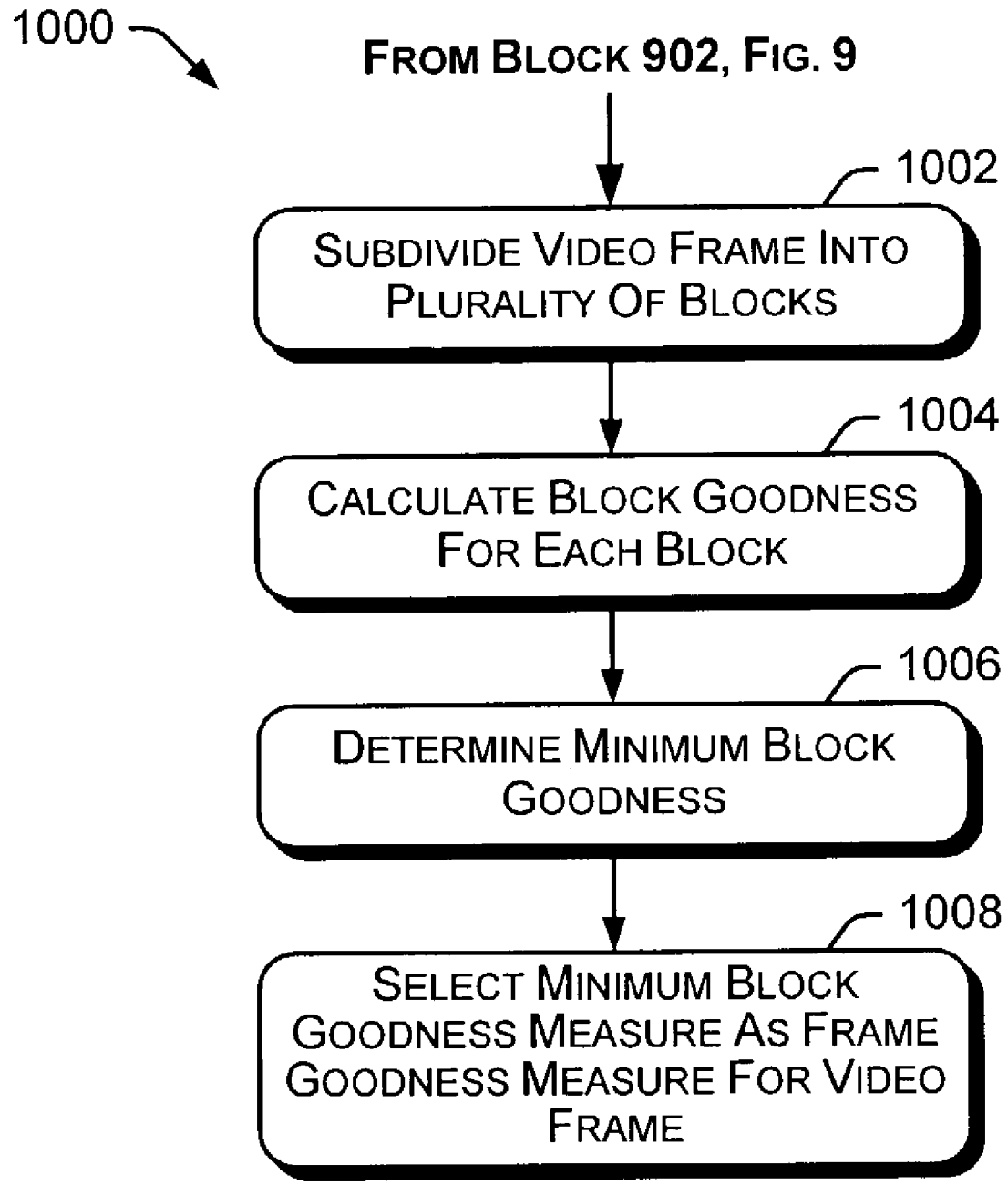

FIG. 10 shows an alternate method 1000 for calculating a goodness measure for a video frame in a video sequence. At block 1002, a video frame is subdivided into a plurality of blocks. The number of blocks may be any appropriate number including, for example, a 16 by 16 group of blocks that make up the video frame. At block 1004, a goodness measure is calculated for each block in the group of blocks. The block goodness measures are calculated in the same manner (i.e., using the same equations) as discussed above regarding the frame goodness measure, except that the calculations are applied to only a portion of a video frame rather than the whole video frame. Once the goodness measures are calculated for each block, the minimum block goodness measure is determined, as shown at block 1006. At block 1008, the minimum block goodness measure is selected to be the overall goodness measure for the video frame.

Figure 11:
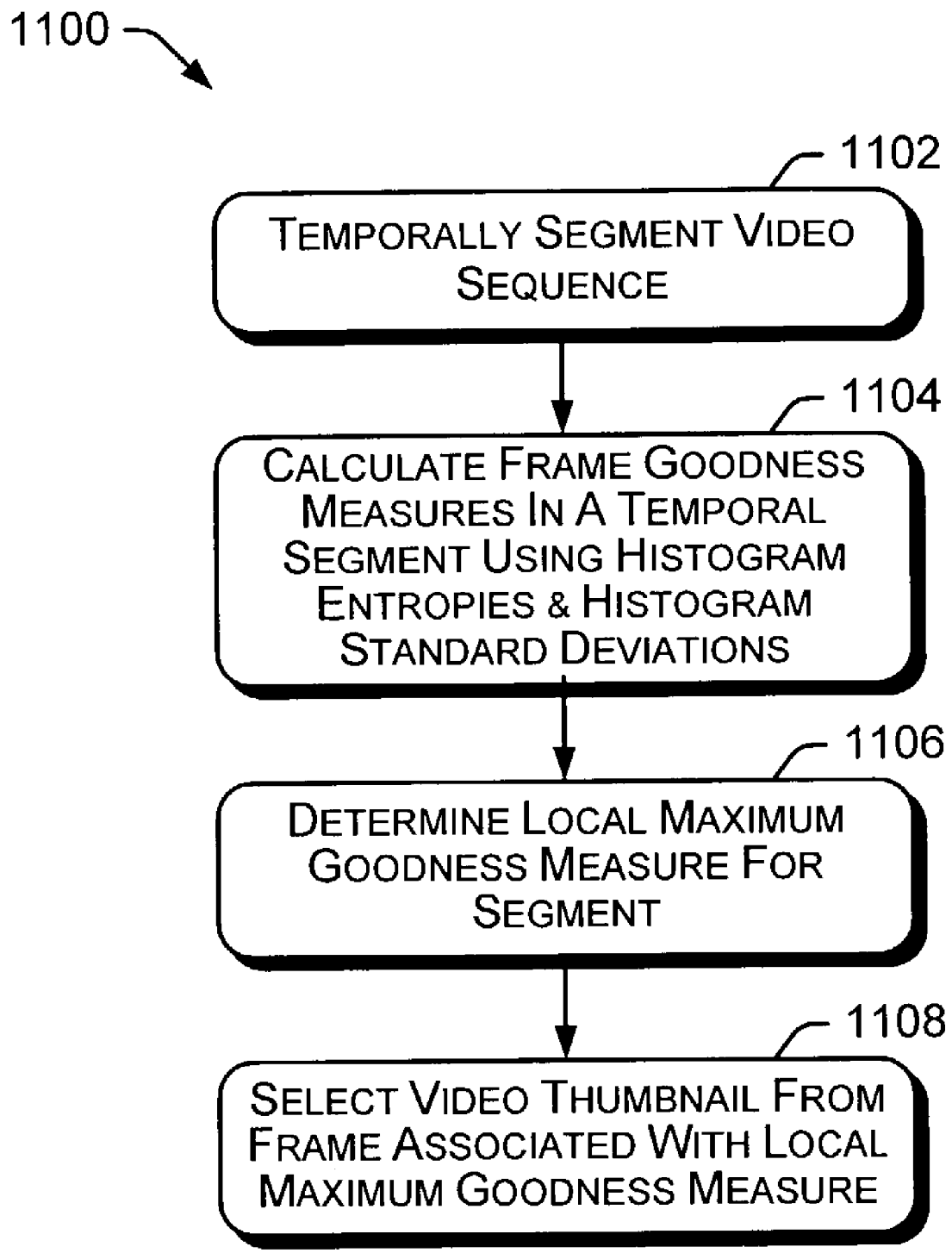

FIG. 11 shows an alternate exemplary method 1100 for identifying a video thumbnail that visually represents the salient content of an entire video sequence. At block 1102, a video sequence is temporally segmented. The video sequence can be temporally segmented on any basis, such as, for example, segmenting the sequence into beginning, middle, and ending segments. At block 1104, a frame goodness measures are calculated for frames within a particular segment of the video sequence. The goodness measures are calculated as discussed above, on the basis of frame histogram entropies and histogram standard deviations. At block 1106, a local maximum goodness measure is determined for the particular segment. At block 1108, a video thumbnail is selected as the frame associated with the local maximum goodness measure.

Figure 12:
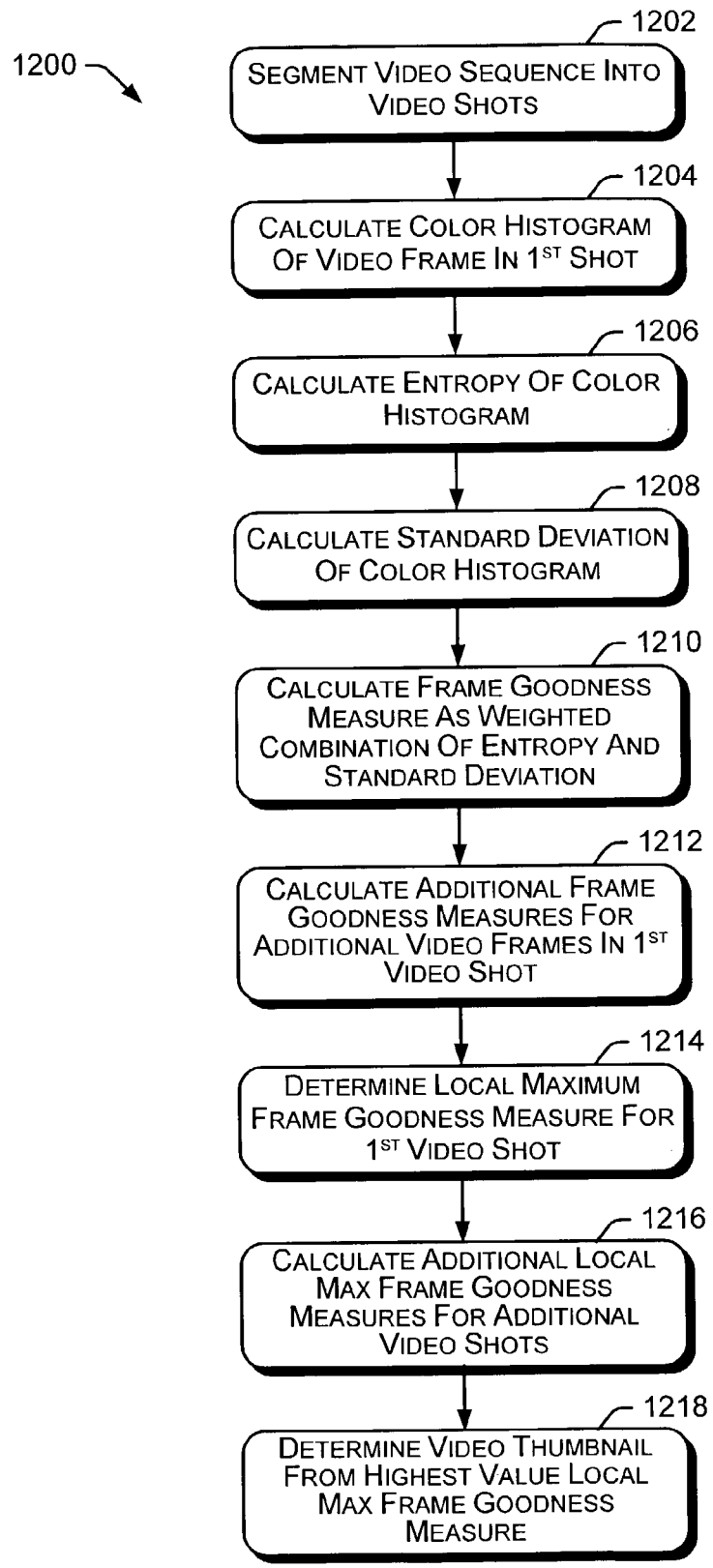

FIG. 12 shows another alternate exemplary method 1200 for identifying a video thumbnail that visually represents the salient content of an entire video sequence. At block 1202, a video sequence is segmented into video shots. At block 1204, a color histogram is calculated on a video frame within the first video shot. At block 1206, the entropy of the color histogram is calculated according to equations (1) and (2) as discussed above. At block 1208, the standard deviation of the color histogram is calculated according to equations (3) and (4) as discussed above. At block 1210, a frame goodness measure is calculated. The frame goodness measure for the frame is calculated as a weighted combination of the entropy and standard deviation according to equations (5) and (6) as discussed above.

At block 1212 of method 1200, additional frame goodness measures are calculated for additional video frames within the first video shot. A local maximum goodness measure is then determined for the first video shot at block 1214. At block 1216, additional local maximum frame goodness measures are calculated for additional video shots in the same manner as for the first video shot. At block 1218, the video frame having the local maximum frame goodness measure with the highest value is selected as the video thumbnail frame that visually represents the salient content of the whole video sequence.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 13:
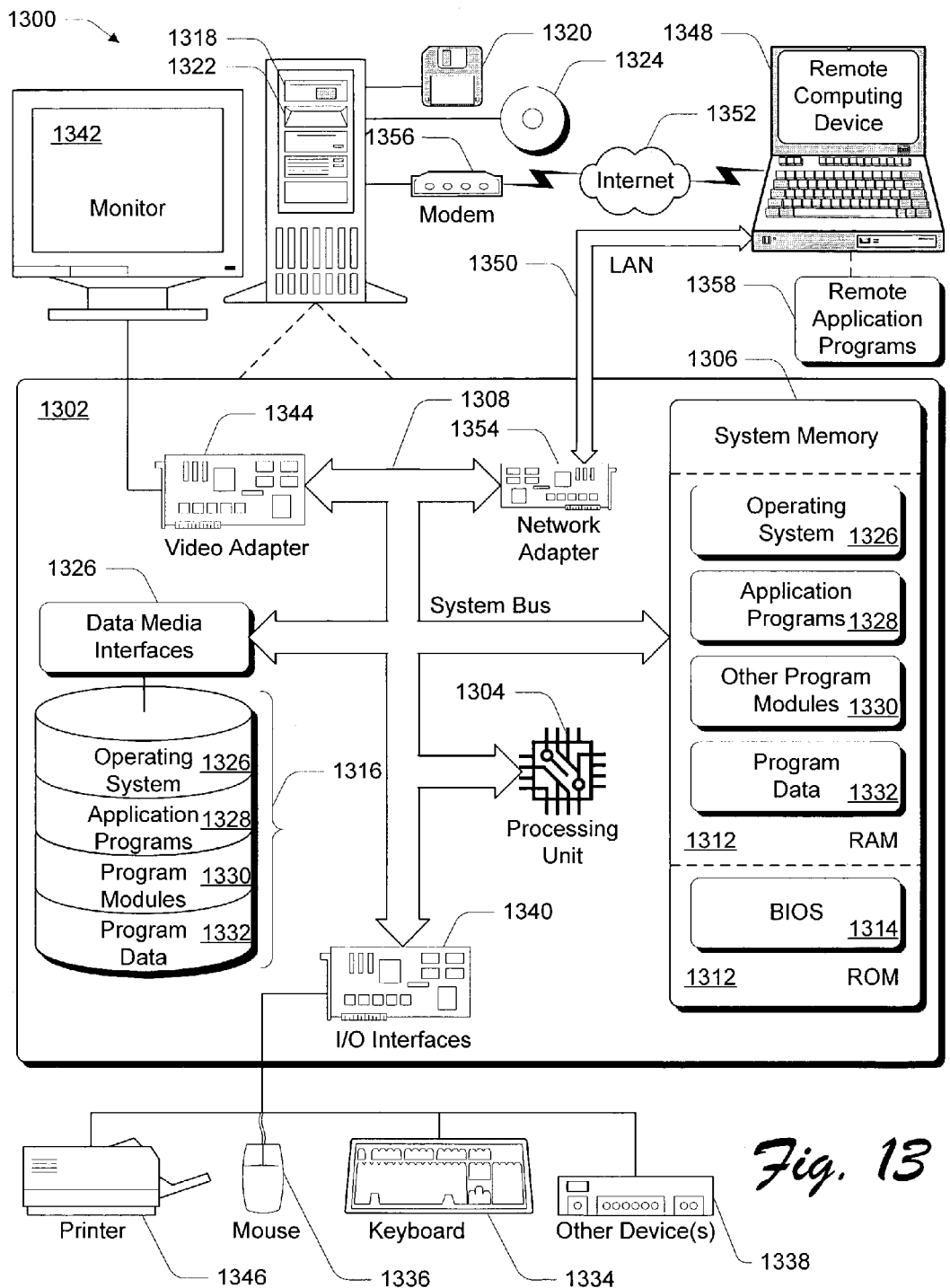
FIG. 13 illustrates an example of a suitable computing environment that may be used to implement a computer.

FIG. 13 illustrates an example of a suitable computing environment 1300 that may be used to implement computer 102. It will be evident, from the discussion to follow, that computer 102 is intended to represent any of a class of general or special purpose computing platforms which, when endowed with the video thumbnail algorithm 308, implement the teachings presently disclosed in accordance with the first exemplary embodiment introduced above with respect to FIG. 3. It is to be appreciated that although the video thumbnail algorithm 308 is depicted in the context of FIG. 3 as a software application, computer 102 may alternatively support a hardware implementation of video thumbnail algorithm 308 as well. In this regard, but for the description of video thumbnail algorithm 308, the following description of computer 102 is intended to be merely illustrative, as computers of greater or lesser capability may well be substituted.

For example, computer 102 may be implemented as any video observation device capable of viewing videos such as computers, personal computers, server computers, handheld or laptop devices, portable communication devices, multiprocessor systems, microprocessor systems, microprocessor-based systems, consumer electronics devices, VCRs, video media players, video-on-demand devices, and other related devices.

The computing environment 1300 includes a general-purpose computing system in the form of a computer 1302. The components of computer 1302 can include, but are not limited to, one or more processors or processing units 1304, a system memory 1306, and a system bus 1308 that couples various system components including the processor 1304 to the system memory 1306.

The system bus 1308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1302 typically includes a variety of computer readable media. Such media can be any available media that is accessible by computer 1302 and includes both volatile and non-volatile media, removable and non-removable media. The system memory 1306 includes computer readable media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is stored in ROM 1312. RAM 1310 typically contains data and/or program modules that are immediately accessible to and/or presently operated on by the processing unit 1304.

Computer 1302 can also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1326. Alternatively, the hard disk drive 1316, magnetic disk drive 1318, and optical disk drive 1322 can be connected to the system bus 1308 by a SCSI interface (not shown).

The disk drives and their associated computer-readable media provide non-volatile storage of computer readable instructions, data structures, program modules, and other data for computer 1302. Although the example illustrates a hard disk 1316, a removable magnetic disk 1320, and a removable optical disk 1324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1316, magnetic disk 1320, optical disk 1324, ROM 1312, and/or RAM 1310, including by way of example, an operating system 1326, one or more application programs 1328, other program modules 1330, and program data 1332. Each of such operating system 1326, one or more application programs 1328, other program modules 1330, and program data 1332 (or some combination thereof) may include an embodiment of a caching scheme for user network access information.

Computer 1302 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1302 via input devices such as a keyboard 1334 and a pointing device 1336 (e.g., a "mouse"). Other input devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor 1342 or other type of display device can also be connected to the system bus 1308 via an interface, such as a video adapter 1344. In addition to the monitor 1342, other output peripheral devices can include components such as speakers (not shown) and a printer 1346 which can be connected to computer 1302 via the input/output interfaces 1340.

Computer 1302 can operate in a networked environment using logical connections to one or more remote computers, such as a remote computing device 1348. By way of example, the remote computing device 1348 can be a personal computer, portable computer, a server, a router, a network computer, a peer device or other common network node, and the like. The remote computing device 1348 is illustrated as a portable computer that can include many or all of the elements and features described herein relative to computer system 1302.

Logical connections between computer 1302 and the remote computer 1348 are depicted as a local area network (LAN) 1350 and a general wide area network (WAN) 1352. Such networking environments are commonplace in offices, enterprise-wide computer networks, intranets, and the Internet. When implemented in a LAN networking environment, the computer 1302 is connected to a local network 1350 via a network interface or adapter 1354. When implemented in a WAN networking environment, the computer 1302 typically includes a modem 1356 or other means for establishing communications over the wide network 1352. The modem 1356, which can be internal or external to computer 1302, can be connected to the system bus 1308 via the input/output interfaces 1340 or other appropriate mechanisms. It is to be appreciated that the illustrated network connections are exemplary and that other means of establishing communication link(s) between the computers 1302 and 1348 can be employed.

In a networked environment, such as that illustrated with computing environment 1300, program modules depicted relative to the computer 1302, or portions thereof, may be stored in a remote memory storage device. By way of example, remote application programs 1358 reside on a memory device of remote computer 1348. For purposes of illustration, application programs and other executable program components, such as the operating system, are illustrated herein as discrete blocks, although it is recognized that such programs and components reside at various times in different storage components of the computer system 1302, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A tangible computer-readable medium comprising computer-program instructions executable by a processor, the computer-program instructions when executed by the processor per for performing operations comprising:
   receiving a video sequence; and
   calculating frame goodness measures for frames within the video sequence from histogram entropies and histogram standard deviations; and
   presenting a visually representative thumbnail based on the frame goodness measures for a user to browse video data.

2. The computer-readable medium of claim 1, comprising further processor-executable instructions configured for determining a maximum goodness measure from the frame goodness measures.

3. The computer-readable medium of claim 2, wherein the computer-program instructions further comprise instructions for generating a video thumbnail from a frame that corresponds with the maximum goodness measure.

4. The computer-readable medium of claim 1, wherein each frame goodness measure is a weighted combination of a histogram entropy and a standard deviation entropy.

5. The computer-readable medium of claim 1, wherein the computer-program instructions further comprise instructions for calculating each histogram entropy.

6. The computer-readable medium of claim 5, wherein the computer-program instructions for calculating each histogram entropy comprise instructions for calculating a color histogram.

7. A processor-readable medium as recited in claim 1, wherein the computer-program instructions further comprise instructions for calculating each histogram standard deviation.

8. The computer-readable medium of claim 7, wherein the computer-program instructions for calculating each histogram standard deviation further comprise instructions for calculating a color histogram.

9. The computer-readable medium of claim 1, wherein the computer-program instructions for calculating a frame goodness measure comprise instructions for:
   subdividing a frame into a plurality of blocks;
   calculating a block goodness measure for each block;
   determining a minimum block goodness measure; and
   selecting the minimum block goodness measure as a frame goodness measure for the frame.

10. The computer-readable medium of claim 1, wherein the computer-program instructions for calculating a frame goodness measure comprise instructions for:
    calculating a color histogram;
    calculating an entropy of the color histogram;
    calculating a standard deviation of the color histogram; and
    calculating the goodness measure as a weighted combination of the entropy and the standard deviation.

11. A tangible computer-readable medium comprising computer-program instructions executable by a processor, the computer-program instructions when executed by the processor for performing operations comprising:
    temporally segmenting a video sequence;
    calculating frame goodness measures within a particular temporal segment using histogram entropies and histogram standard deviations;
    determining from the frame goodness measures, a local maximum goodness measure for the particular temporal segment; and
    presenting a visually representative thumbnail based on the local maximum goodness measure for a user to browse video data.

12. The computer-readable medium of claim 11, wherein the computer-program instructions further comprise instructions for generating a video thumbnail from a frame associated with the local maximum goodness measure.

13. The computer-readable medium of claim 11 wherein a frame goodness measure is calculated for every nth frame within the particular temporal segment and n is equal to or greater than 1.

14. The computer-readable medium of claim 11, wherein each goodness measure is a weighted combination of a histogram entropy and a standard deviation entropy.

15. The computer-readable medium of claim 11, wherein the particular temporal segment is selected from:
    a beginning temporal segment of the video sequence;
    a middle temporal segment of the video sequence; and
    an ending temporal segment of the video sequence.

16. The computer-readable medium of claim 11, wherein the computer-program instructions for calculating a frame goodness measure further comprise instructions for:
    subdividing a frame into a plurality of blocks;
    calculating a block goodness measure for each block;

determining a minimum block goodness measure; and
selecting the minimum block goodness measure as a frame goodness measure for the frame.

17. A tangible computer-readable medium comprising computer-program instructions executable by a processor, the computer-program instructions when executed by the processor for performing operations comprising:
   segmenting a video sequence into a plurality of video shots;
   calculating a color histogram of a video frame in a first video shot;
   calculating an entropy of the color histogram;
   calculating a standard deviation of the color histogram;
   calculating a frame goodness measure as a weighted combination of the entropy and the standard deviation; and
   presenting a visually representative thumbnail based on the frame goodness measure for a user to browse video data.

18. The computer-readable medium of claim 17, wherein the computer-program instructions further comprise instructions for:
   calculating additional frame goodness measures for additional video frames in the first video shot; and
   determining a local maximum frame goodness measure for the first video shot by comparing frame goodness measures.

19. The computer-readable medium of claim 18, wherein the computer-program instructions further comprise instructions for:
   calculating additional local maximum frame goodness measures for additional video shots in the video sequence; and
   determining a thumbnail video frame for the video sequence by comparing local maximum frame goodness measures.

20. The computer-readable medium of claim 19, wherein the computer-program instructions for determining further comprise instructions for:
   identifying a highest valued local maximum frame goodness measure; and
   selecting a video frame corresponding to the highest valued local maximum frame goodness measure as the thumbnail video frame.

21. A tangible computer-readable medium comprising computer-program instructions executable by a processor, the computer-program instructions when executed by the processor for performing operations comprising:
   segmenting a video sequence into a plurality of shots;
   selecting a frame from each of the plurality of shots;
   for each selected frame, calculating a frame goodness measure as a function of a histogram entropy and a histogram standard deviation;
   determining a thumbnail frame from the selected frames as a function of the frame goodness measures; and
   wherein the thumbnail frame is for presentation to a user to facilitate user browsing of video data.

22. The computer-readable medium of claim 21, wherein the computer-program instructions for determining further comprise instructions for:
   identifying a maximum frame goodness measure from the frame goodness measures; and
   determining the thumbnail frame as a frame associated with the maximum frame goodness measure.

23. The computer-readable medium of claim 21, wherein the computer-program instructions for calculating a goodness measure further comprise instructions for:
   calculating a color histogram;
   calculating an entropy of the color histogram;
   calculating a standard deviation of the color histogram; and
   calculating the goodness measure as a weighted combination of the entropy and the standard deviation.

24. The computer-readable medium of claim 21, wherein the computer-program instructions for segmenting further comprise instructions for performing a shot boundary detection.

25. A computer-implemented method comprising:
   calculating a color histogram of a video frame in a video sequence;
   calculating an entropy of the color histogram;
   calculating a standard deviation of the color histogram;
   calculating a frame goodness measure as a weighted combination of the entropy and the standard; and
   display in a visually representative video thumbnail based on the frame goodness measure for user browsing of video data.

26. The method of claim 25, further comprising:
   calculating additional frame goodness measures for additional video frames in the video sequence; and
   determining a thumbnail video frame for the video sequence by comparing frame goodness measures.

27. The method of claim 26, wherein the determining further comprises:
   identifying a maximum frame goodness measure; and
   selecting a video frame corresponding to the maximum frame goodness measure as the thumbnail video frame.

28. A computer-implemented method comprising:
   temporally segmenting a video sequence;
   calculating frame goodness measures within a particular temporal segment using histogram entropies and histogram standard deviations;
   determining from the frame goodness measures, a local maximum goodness measure for the particular temporal segment; and
   displaying a visually representative video thumbnail based on the local maximum goodness measure for user browsing of video data.

29. The method of claim 28, further comprising generating a video thumbnail from a frame associated with the local maximum goodness measure.

30. A computer-implemented method comprising:
   segmenting a video sequence into a plurality of shots;
   selecting a frame from each of the plurality of shots;
   for each selected frame, calculating a frame goodness measure as a function of a histogram entropy and a histogram standard deviation;
   determining a thumbnail frame from the selected frames as a function of the frame goodness measures; and
   displaying the thumbnail frame for user browsing of video data.

31. The method of claim 30, wherein the determining further comprises:
   identifying a maximum frame goodness measure from the frame goodness measures; and
   determining the thumbnail frame as a frame associated with the maximum frame goodness measure.

32. A computing device comprising:
   a processor; and
   a memory coupled to the processor, the memory comprising video content and computer-program instructions executable by the processor, the computer-program instructions being configured such that when executed by the processor to implement a video thumbnail algorithm the video thumbnail algorithm being configured to determine a visually representative video thumbnail frame by calculating a frame goodness measure for each of a plurality of video frames within the video content, each frame goodness measure comprising a weighted combination of a frame histogram entropy and a frame histogram standard deviation.

33. A video device comprising:
a processor; and
a memory coupled to the processor, the memory comprising computer-program instructions executable by the processor for performing operations comprising:
recording video content; and
determining a video thumbnail; and
wherein the determining comprises calculating a frame goodness measure for each of a plurality of video frames within the video content, each frame goodness measure being based on a weighted combination of a frame histogram entropy and a frame histogram standard deviation.

34. The video device of claim 33, further comprising a hardware circuit block configured to implement the video thumbnail algorithm.

35. A video recording device comprising:
means for calculating a color histogram of a video frame in a video sequence;
means for calculating an entropy of the color histogram;
means for calculating a standard deviation of the color histogram;
means for calculating a frame goodness measure as a weighted combination of the entropy and the standard deviation; and
means for displaying in a visually representative video thumbnail based on the frame goodness measure for user browsing of video data.

36. A computer comprising:
means for receiving a video sequence;
means for calculating frame goodness measures for frames within the video sequence from histogram entropies and histogram standard deviations; and
means for displaying a visually representative video thumbnail based on the frame goodness measure for user browsing of video data.

37. A computer comprising:
means for calculating a color histogram of a video frame in a video sequence;
means for calculating an entropy of the color histogram;
means for calculating a standard deviation of the color histogram;
means for calculating a frame goodness measure as a weighted combination of the entropy and the standard; and
means for displaying a visually representative video thumbnail based on the frame goodness measure for user browsing of video data.

38. A computer comprising:
means for temporally segmenting a video sequence;
means for calculating frame goodness measures within a particular temporal segment using histogram entropies and histogram standard deviations;
means for determining from the frame goodness measures, a local maximum goodness measure for the particular temporal segment; an
means for displaying a visually representative video thumbnail based on the maximum goodness measure for user browsing of video data.

39. A computer comprising:
means for segmenting a video sequence into a plurality of shots;
means for selecting a frame from each of the plurality of shots;
means for calculating a frame goodness measure as a function of a histogram entropy and a histogram standard deviation for each selected frame;
means for determining a thumbnail frame from the selected frames as a function of the frame goodness; and
means for displaying the thumbnail frame for user browsing of video data.

* * * * *